United States Patent
Smith et al.

(10) Patent No.: US 9,841,064 B2
(45) Date of Patent: Dec. 12, 2017

(54) REDUCED DRAG CLUTCH PLATE

(71) Applicant: Schaeffler Technologies AG & Co. KG, Herzogenaurach (DE)

(72) Inventors: David Smith, Wadsworth, OH (US); Rashid Farahati, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/065,051

(22) Filed: Mar. 9, 2016

(65) Prior Publication Data
US 2016/0265597 A1    Sep. 15, 2016

Related U.S. Application Data (60) Provisional application No. 62/132,227, filed on Mar. 12, 2015, provisional application No. 62/252,137, filed on Nov. 6, 2015.

(51) Int. Cl.
*F16D 13/69* (2006.01)
*F16D 13/64* (2006.01)
*F16D 69/04* (2006.01)

(52) U.S. Cl.
CPC .......... *F16D 13/69* (2013.01); *F16D 13/648* (2013.01); *F16D 2069/0466* (2013.01); *F16D 2250/0069* (2013.01); *F16D 2300/14* (2013.01)

(58) Field of Classification Search
CPC ....................................................... F16D 13/69
See application file for complete search history.

(56) References Cited

U.S. PATENT DOCUMENTS 2,135,126 A * 11/1938 Harwood ................ F16D 13/64
                                                   192/107 C
4,548,306 A    10/1985 Hartz
(Continued)

FOREIGN PATENT DOCUMENTS

| DE | 102008062643 | * | 6/2010 |
| DE | 102010006015 | * | 8/2011 |
| JP | 08200389 A   |   | 8/1996 |

OTHER PUBLICATIONS

International Search Report and Opinion for PCT/US2016/021480; 10 pgs; dated Jun. 15, 2016 by Korean Intellectual Property Office.

*Primary Examiner* — Mark A Manley
(74) *Attorney, Agent, or Firm* — LeKeisha M. Suggs (57) ABSTRACT

A clutch plate includes first and second axially offset annular surfaces, a first angled surface extending at an acute angle from the first annular surface in a first axial direction, and a second angled surface extending at an acute angle from the first annular surface in a second axial direction, opposite the first axial direction. In some example embodiments, the clutch plate has a wet friction material fixed to the first and second annular surfaces and at least one of the first and second angled surfaces. In an example aspect, the clutch plate has a low friction wet friction material fixed to the wet friction material of the at least one of the first and second angled surfaces. The low friction wet friction material may be fixed to the wet friction material by infusion or bonding. In an example embodiment, the clutch plate has a first wet friction material fixed to the first and second annular surfaces, and a second, low friction wet friction material fixed to at least one of the first and second angled surfaces.

15 Claims, 6 Drawing Sheets

(56) References Cited

U.S. PATENT DOCUMENTS

| | | |
|---|---|---|
| 8,056,694 B2 | 11/2011 | Samie |
| 2009/0000899 A1 | 1/2009 | Paterra et al. |
| 2014/0291107 A1 | 10/2014 | Lister et al. |
| 2014/0321782 A1 | 10/2014 | Farahati et al. |
| 2014/0339045 A1 | 11/2014 | Lindemann |

* cited by examiner

REDUCED DRAG CLUTCH PLATE

FIELD

The invention relates generally to a clutch plate, and more specifically to a reduced drag clutch plate with bent tabs.

BACKGROUND

Low drag clutch plates are known. One example is shown in commonly-assigned United States Patent Application Publication No. 2014/0339045 titled REDUCED DRAG CLUTCH PLATE to Lindemann, hereby incorporated by reference as if set forth fully herein.

BRIEF SUMMARY

Example aspects broadly comprise a clutch plate including first and second axially offset annular surfaces, a first angled surface extending at an acute angle from the first annular surface in a first axial direction, and a second angled surface extending at an acute angle from the first annular surface in a second axial direction, opposite the first axial direction. In some example embodiments, the clutch plate has a wet friction material fixed to the first and second annular surfaces and at least one of the first and second angled surfaces. In an example aspect, the clutch plate has a low friction wet friction material fixed to the wet friction material of the at least one of the first and second angled surfaces. The low friction wet friction material may be fixed to the wet friction material by infusion or bonding. In an example embodiment, the clutch plate has a first wet friction material fixed to the first and second annular surfaces, and a second, low friction wet friction material fixed to at least one of the first and second angled surfaces.

In some example embodiments, the clutch plate has respective scalloped portions on opposite circumferential sides of the first and second angled surfaces. In an example embodiment, the clutch plate has respective bend portions connecting the first and second angled surfaces with the first annular surface, and the respective scalloped portions extend radially beyond the respective bend portions. In some example embodiments, the first and second annular surfaces comprise first and second circumferential edges that are discontinuous at the scalloped portions. In an example embodiment, the clutch plate has respective bend portions connecting the first and second angled surfaces with the first annular surfaces. A radial distance between the first circumferential edges and the respective bend portions is less than a radial distance between the first and second circumferential edges and respective radiused ends of the scalloped portions.

In some example embodiments, the first and second annular surfaces include first and second circumferential edges, respectively. The clutch plate includes a circumferential surface joining the first and second circumferential edges and a plurality of spline tooth portions protruding from the circumferential surface. In some example embodiments, the clutch plate has respective pairs of scalloped portions on opposite circumferential sides of the first and second angled surfaces. In an example embodiment, the clutch plate has a plurality of continuous tooth portions extending circumferentially beyond respective pairs of scalloped portions.

Other example aspects broadly comprise the clutch plate and a pair of separator plates on opposite axial sides of the clutch plate. In an example embodiment, the pair of separator plates comprise respective annular surfaces with outer diameters extending radially beyond the clutch plate angled surfaces. In an example embodiment, the clutch plate has an inner spline portion and the separator plates comprise respective outer spline portions.

Other example aspects broadly comprise a clutch plate for a transmission including a notched annular surface and a plurality of angled surfaces extending radially outward between respective pairs of notches at an acute angle to the annular surface. In an example embodiment, a first one of the plurality of angled surfaces extends in a first axial direction and a second one of the plurality of angled surfaces extends in a second axial direction, opposite the first axial direction. In some example embodiments, the clutch plate has friction material fixed to the annular surface and at least one of the first and second pluralities of angled surfaces. In an example embodiment, the clutch plate has a low friction material fixed to the friction material of the at least one of the first and second pluralities of angled surfaces. The low friction material may be fixed to the friction material by infusion or bonding. In an example embodiment, the clutch plate has a first friction material fixed to the annular surface, and a second, low friction material fixed to at least one of the first and second pluralities of angled surfaces. In some example embodiments, the clutch plate has an inner spline portion. In an example embodiment, the inner spline portion includes a plurality of joined tooth portions extending circumferentially beyond the respective pairs of notches. In an example embodiment, an outer diameter of the annular surface and respective outer diameters of the angled surfaces are radially aligned.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
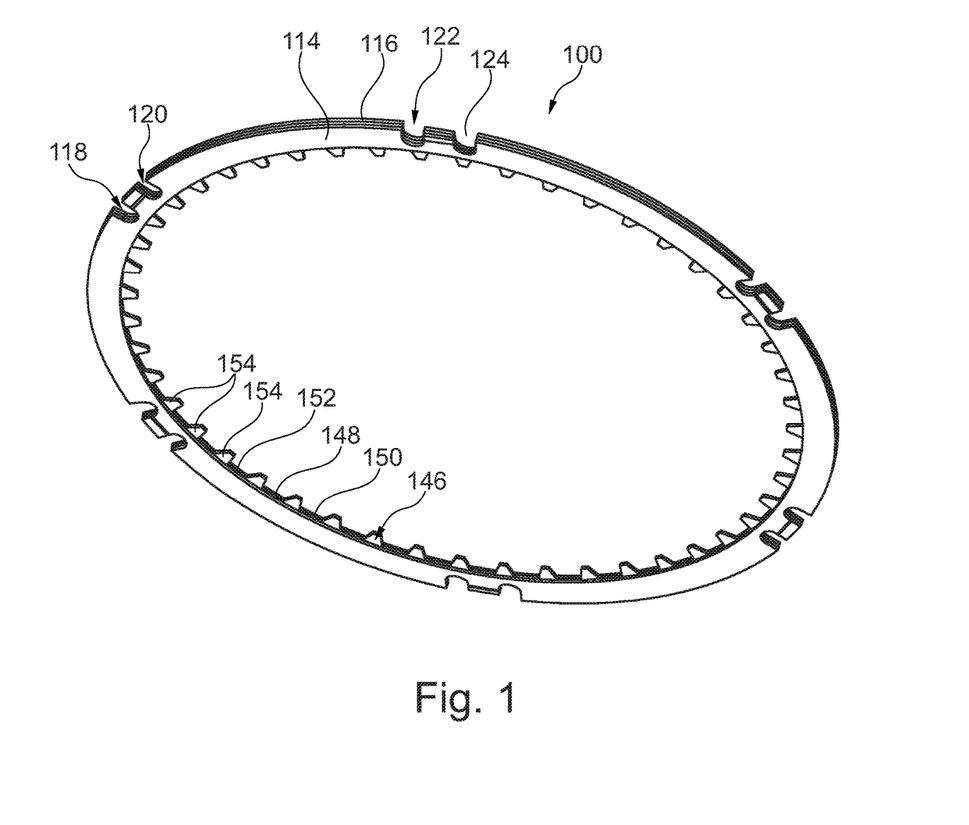
FIG. 1 is a perspective view of a clutch plate according to an example aspect.
Figure 2:
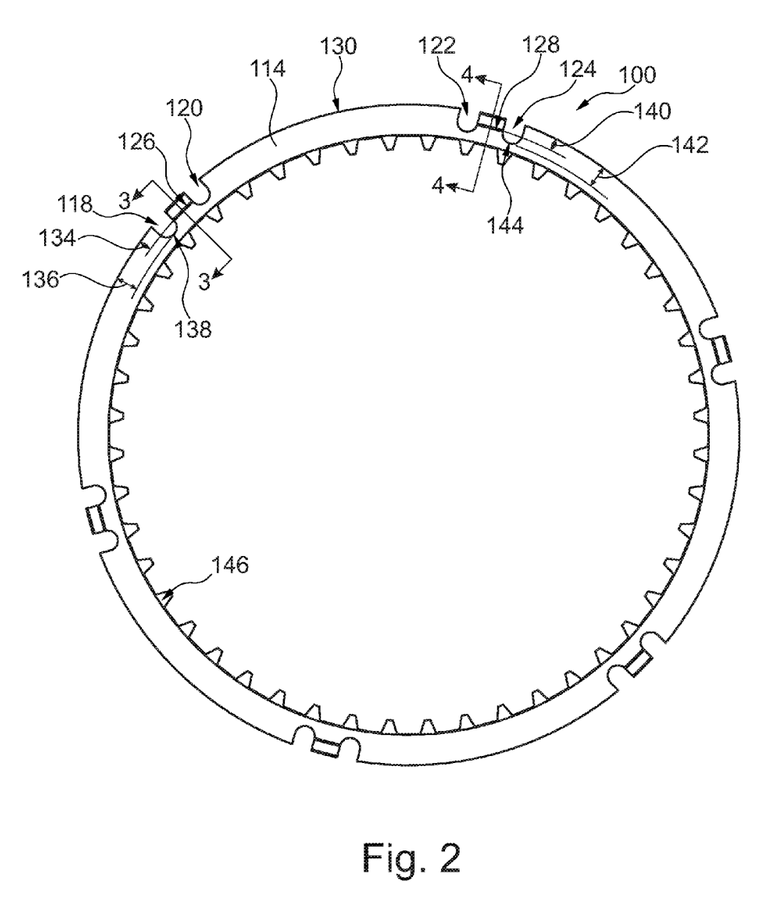
FIG. 2 is a front view of the clutch plate of FIG. 1.
Figure 3:
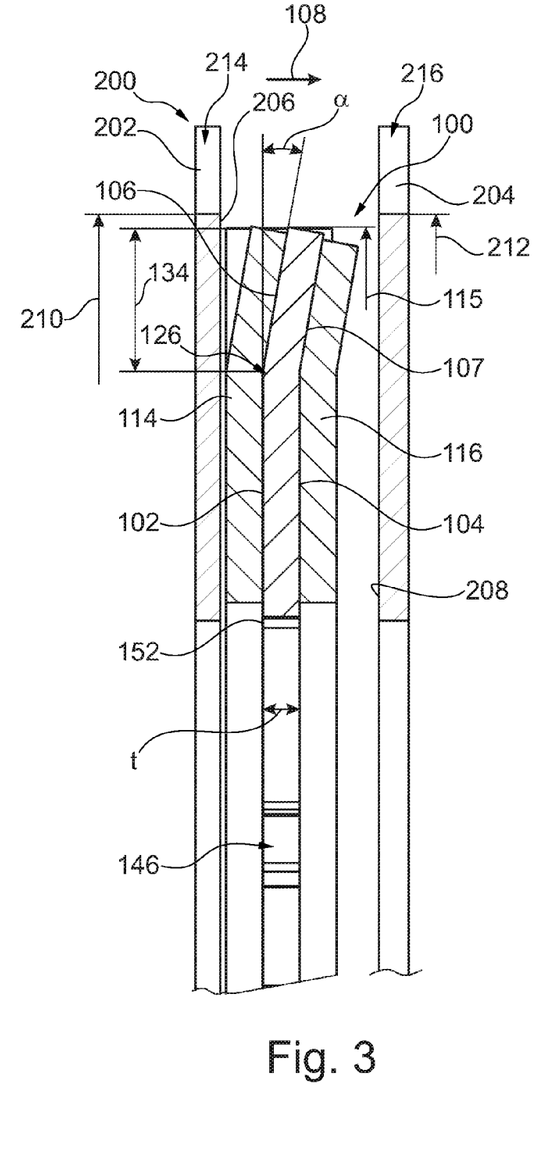
FIG. 3 is a cross-section view of the clutch plate of FIG. 1 taken generally along line 3-3 in FIG. 2 shown with separator plates.
Figure 4:
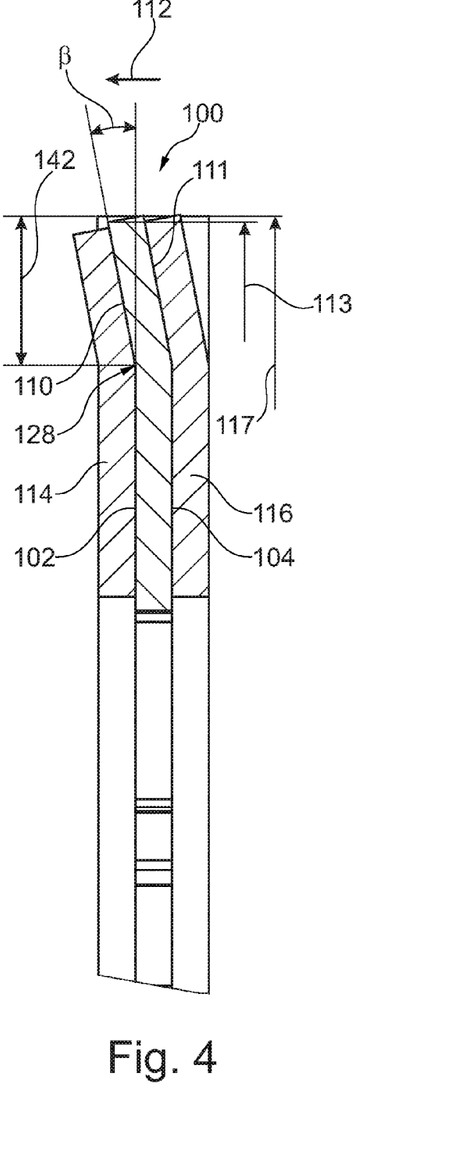
FIG. 4 is a cross-section view of the clutch plate of FIG. 1 taken generally along line 4-4.

The following description is made with reference to FIGS. 1-4. FIG. 1 is a perspective view of clutch plate 100 according to an example aspect. FIG. 2 is a front view of clutch plate 100 of FIG. 1. FIG. 3 is a cross-section view of clutch plate 100 taken generally along line 3-3 in FIG. 2 shown with separator plates. FIG. 4 is a cross-section view of clutch plate 100 taken generally along line 4-4. Clutch plate (or disc) 100 includes axially offset annular surfaces 102 and 104, angled surface (or tab) 106 extending at acute angle α from annular surface 102 in axial direction 108, and angled surface 110 extending at acute angle β from annular surface 102 in axial direction 112, opposite axial direction 108. It is preferable to have an even number of tabs with half extending in axial direction 108 (i.e., tabs 106) and the other half extending in direction 112 (i.e., tabs 110). Although 6 tabs are shown, other numbers are possible. For example clutch plate 100 may include 4 or 8 tabs, or even more, depending on the application.

Outer diameter 113 of annular surface 102 and respective outer diameters 115 and 117 of angled surfaces 106 and 110 are radially aligned. That is, a difference between diameters 113, 115, and 117 is less than a thickness t of the clutch plate. Clutch plate 100 further includes wet friction material 114 fixed to annular surface 102 and angled surfaces 106 and 110, and wet friction material 116 fixed to annular surface 104 and angled surfaces 107 and 111, axially offset from angled surfaces 106 and 110. Wet friction material may be continuous as shown, or may include a first ringed portion affixed to the annular surface and a second tab portion affixed to the angled surface. In either case, the wet friction material extends to a radial extent of the tab such that, when installed adjacent to a separator plate as described below, the friction material contacts the separator plate, not the steel.

Clutch plate 100 further includes scalloped portions 118 and 120 on opposite circumferential sides of angled surface 106, and scalloped portions 122 and 124 on opposite circumferential sides of angled surface 110. In other words, clutch plate 100 includes notched annular surface 102 and angled surfaces 106 and 110 extending radially outward between respective pairs of notches (i.e., scalloped portions 118 and 120) at an acute angle (i.e., angle α) to the annular surface.

Clutch plate 100 further includes bend portion 126 connecting angled surface 106 with annular surface 102, and bend portion 128 connecting angled surface 110 with annular surface 104. Scalloped portions 118 and 120 extend radially beyond bend portion 126 and scalloped portions 122 and 124 extend radially beyond bend portion 128. Annular surface 102 includes circumferential edge 130 that is discontinuous at scalloped portions 118, 120, 122, and 124. Radial distance 134 between circumferential edge 130 and bend portion 126 is less than radial distance 136 between circumferential edge 130 and radiused end 138 of scalloped portion 118. Similarly, radial distance 140 between circumferential edge 130 and bend portion 128 is less than radial distance 142 between circumferential edge 130 and radiused end 144 of scalloped portion 124.

Clutch pack assembly 200 includes clutch plate 100 and separator plates 202 and 204 on opposite axial sides of the clutch plate. Separator plates 202 and 204 include respective annular surfaces 206 and 208 with outer diameters 210 and 212 extending radially beyond clutch plate angled surfaces 106 and 110, respectively. Clutch plate 100 includes inner spline portion 146. Otherwise stated, annular surfaces 102 and 104 include circumferential edges 148 and 150, respectively. Clutch plate 100 includes circumferential surface 152 joining circumferential edges 148 and 150, and spline tooth portions 154 protruding from the circumferential surface. Angled surfaces, or tabs, 126 and 128 are circumferentially aligned with a gap between respective pairs of spline teeth. That is, a centerline of the gap is circumferentially aligned with a centerline of the tabs.

Separator plates 202 and 204 comprise respective outer spline portions 214 and 216. Although the clutch plate is shown with an inner spline portion and the separator plates are shown with outer spline portions, other variations are possible. For example, the clutch plate may include an outer spline portion and the separator plates may include inner spline portions. Similarly, although the angled surfaces are shown at an outer diameter of the clutch plate, other embodiments may include the angled surfaces at an inner diameter of the clutch plate.

Figure 5:
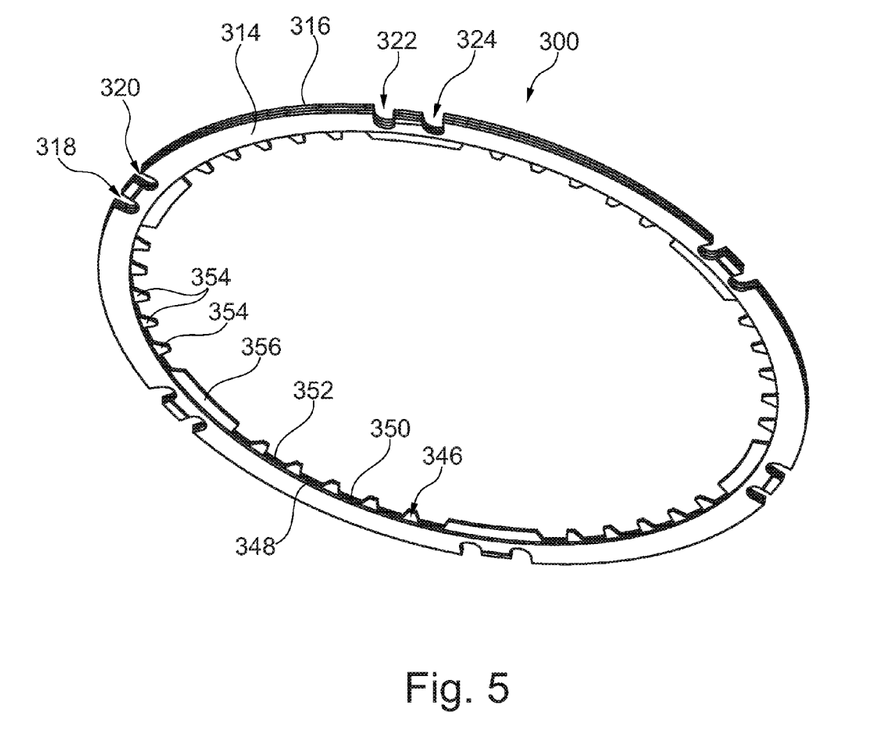
FIG. 5 is a perspective view of a clutch plate according to an example aspect.
Figure 6:
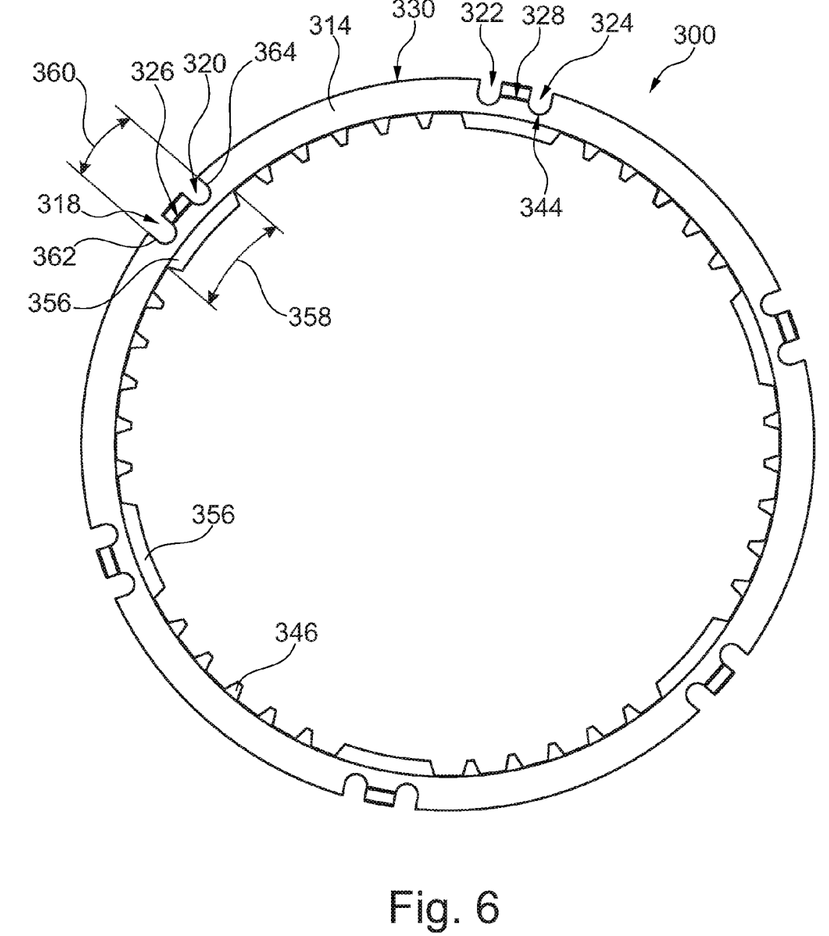
FIG. 6 is a front view of the clutch plate of FIG. 5.

The following description is made with reference to FIGS. 5-6. FIG. 5 is a perspective view of clutch plate 300 according to an example aspect. FIG. 6 is a front view of clutch plate 300 of FIG. 5. Clutch plate 300 is generally equivalent to clutch plate 100 and all 3XX labels correspond to 1XX labels except as described below. Clutch plate 300 includes continuous tooth portions 356 extending circumferentially beyond respective pairs of scalloped portions. Otherwise stated, inner spline portion 346 includes a plurality of joined tooth portions 356 extending circumferentially beyond respective pairs of notches (i.e., notches 318 and 320). That is, circumferential length 358 of joined tooth portion 356 is greater than circumferential length 360 from edge 362 of notch 318 to edge 364 of notch 320.

The angled surfaces help axially deflect the separator plates when the clutch is disengaged to reduce viscous drag from fluid in the transmission. The angled surfaces are deflectable to axially align with the annular surfaces when the clutch is applied. Tab stiffness can be adjusted by varying tab geometry such as the width and depth, for example. Depending on the application, the continuous tooth portions can limit deflection of the angled surfaces due to centrifugal forces or improve burst durability of the clutch plate at high rotational speeds.

Figure 7:
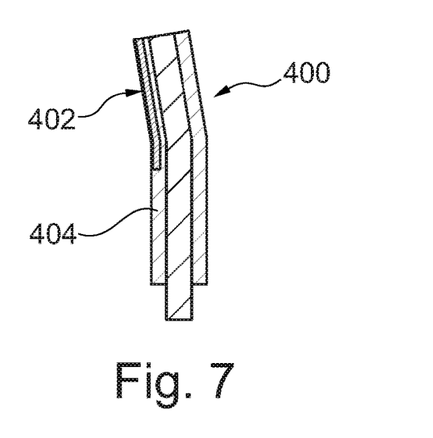
FIG. 7 is a detail cross-section view of a clutch plate according to an example aspect.
Figure 8:
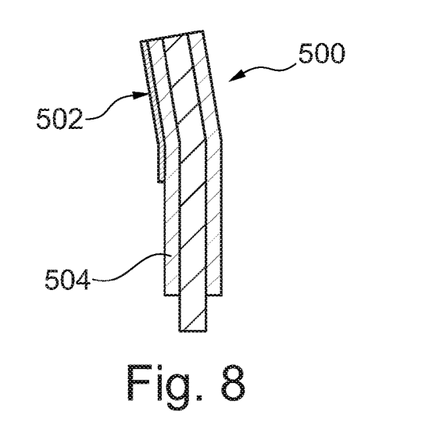
FIG. 8 is a detail cross-section view of a clutch plate according to an example aspect.
Figure 9:
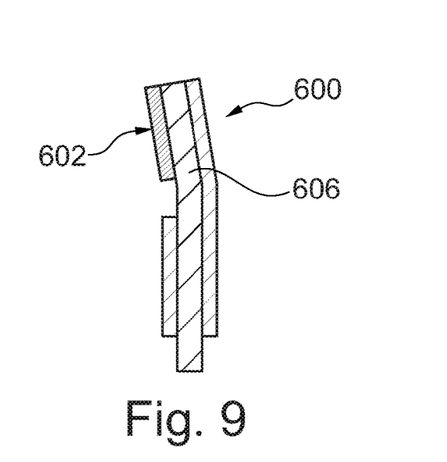
FIG. 9 is a detail cross-section view of a clutch plate according to an example aspect.

The following description is made with reference to FIGS. 7-9. FIG. 7 is a detail cross-section view of clutch plate 400 according to an example aspect. FIG. 8 is a detail cross-section view of clutch plate 500 according to an example aspect. FIG. 9 is a detail cross-section view of clutch plate 600 according to an example aspect. Clutch plates 400, 500, and 600 include respective low friction material portions 402, 502, and 602. Clutch plates 400 and 500 include low friction material portions 402 and 502, respectively, fixed to friction material segments 404 and 504, respectively. Low friction material portion 402 is fixed to friction material segment 404 by infusion, for example. Low friction material portion 502 is fixed to friction material segment 504 by bonding, for example.

Clutch plate 600 includes low friction material portion 602 affixed to angled tab 606 by bonding, for example. That is, an adhesive is used to fix portion 602 to tab 606. The low friction material may include an outer resin layer similar to that shown and described in commonly-assigned United States Patent Publication No. 2014/0321782 titled "THRUST WASHER INCLUDING WET FRICTION MATERIAL WITH RESIN COATED SURFACE", hereby incorporated by reference as if set forth fully herein. By infuse, we mean that a liquid phenolic resin is added to the surface of an uncured friction material so that the resin soaks into a top layer of the friction material. The friction material and low friction material are then cured together in an oven. By bonding, we mean that a layer of a phenolic resin film is applied to the surface of an uncured friction material so that the film sits on a top layer of the friction material. The friction material and low friction material are then cured together in an oven.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A clutch plate comprising: a first annular surface comprising a first outer diameter and a plurality of notches; a first angled surface extending radially outward between a first pair of notches at an acute angle from the first annular surface in a first axial direction, the first angled surface including a second outer diameter; a second angled surface extending radially outward between a second pair of notches at an acute angle from the first annular surface in a second axial direction, opposite the first axial direction, the second angled surface including a third outer diameter radially aligned with the first and second outer diameters; and, an inner spline including a first spline tooth extending circumferentially beyond the first pair of notches, a second spline tooth extending circumferentially beyond the second pair of notches, and a third spline tooth protruding outwardly from between the first and second spline tooth, wherein a circumferential length of the third spline tooth is less than a circumferential length of the first or second spline tooth.

2. The clutch plate of claim 1 further comprising a second annular surface axially offset from the first annular surface and a wet friction material fixed to the first and second annular surfaces and at least one of the first and second angled surfaces.

3. The clutch plate of claim 2 further comprising a low friction wet friction material fixed to the wet friction material of the at least one of the first and second angled surfaces, wherein the low friction wet friction material is fixed to the wet friction material by infusion or bonding.

4. The clutch plate of claim 1 further comprising a second annular surface axially offset from the first annular surface and a first wet friction material fixed to the first and second annular surfaces, and a second, low friction wet friction material fixed to at least one of the first and second angled surfaces.

5. The clutch plate of claim 1 further comprising respective bend portions connecting the first and second angled surfaces with the first annular surface, and the first and second pairs of notches extend radially beyond the respective bend portions.

6. The clutch plate of claim 1 wherein the first annular surface comprises a first circumferential edge that is discontinuous at the notches.

7. The clutch plate of claim 6 further comprising respective bend portions connecting the first and second angled surfaces with the first annular surface, and a radial distance between the first circumferential edge and the respective bend portions is less than a radial distance between the first circumferential edge and respective radiused ends of the notches.

8. The clutch plate of claim 1 further comprising a second annular surface axially offset from the first annular surface; wherein:
the first and second annular surfaces comprise first and second circumferential edges, respectively; and,
the clutch plate comprises:
a circumferential surface joining the first and second circumferential edges.

9. A clutch pack assembly comprising:
the clutch plate of claim 1; and,
a pair of separator plates on opposite axial sides of the clutch plate.

10. The clutch pack assembly of claim 9 wherein the pair of separator plates comprise respective annular surfaces with outer diameters extending radially beyond the clutch plate angled surfaces.

11. A clutch plate for a transmission comprising:
a notched annular surface;
a plurality of angled surfaces extending radially outward between respective pairs of notches at an acute angle to the annular surface wherein an outer diameter of the annular surface and respective outer diameters of the angled surfaces are radially aligned; and,
an inner spline including a plurality of spline teeth, wherein a first one of the plurality of spline teeth extends circumferentially beyond a single pair of notches and a second one of the plurality of spline teeth extends circumferentially less than the first one of the plurality of spline teeth.

12. The clutch plate of claim 11 wherein a first one of the plurality of angled surfaces extends in a first axial direction and a second one of the plurality of angled surfaces extends in a second axial direction, opposite the first axial direction.

13. The clutch plate of claim 12 further comprising a friction material fixed to the annular surface and at least one of the first or second pluralities of angled surfaces.

14. The clutch plate of claim 13 further comprising a low friction material fixed to the friction material of the at least one of the first and second pluralities of angled surfaces, wherein the low friction material is fixed to the friction material by infusion or bonding.

15. The clutch plate of claim 11 further comprising a first friction material fixed to the annular surface, and a second, low friction material fixed to at least one of the first and second pluralities of angled surfaces.

* * * * *